Sept. 18, 1956 V. O. HAUSWIRTH 2,763,201
BALE DENSITY CONTROL DEVICE
Filed Jan. 11, 1952 2 Sheets-Sheet 1
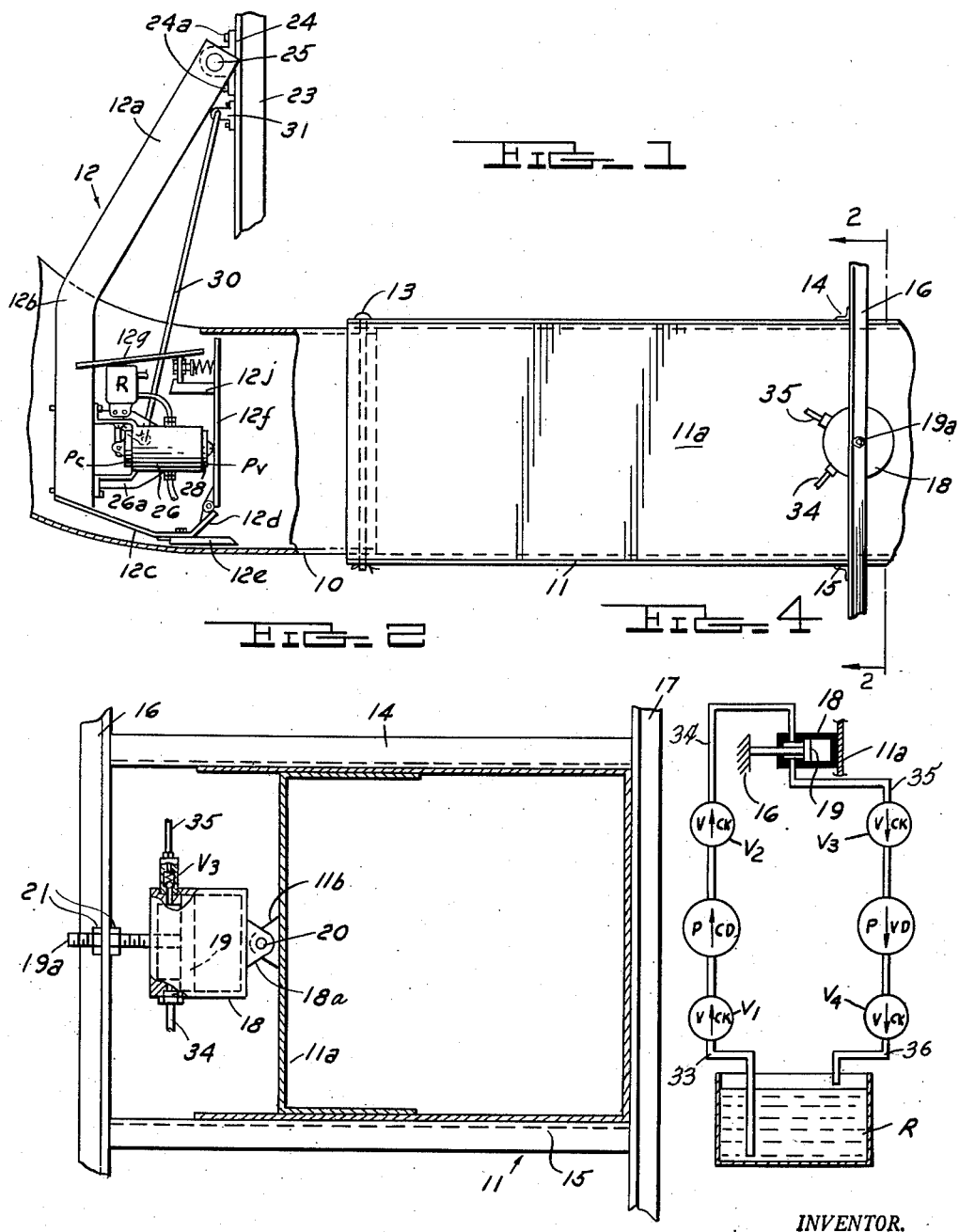
INVENTOR.
VERNON O. HAUSWIRTH
BY
ATTORNEYS Sept. 18, 1956     V. O. HAUSWIRTH     2,763,201
BALE DENSITY CONTROL DEVICE
Filed Jan. 11, 1952     2 Sheets-Sheet 2
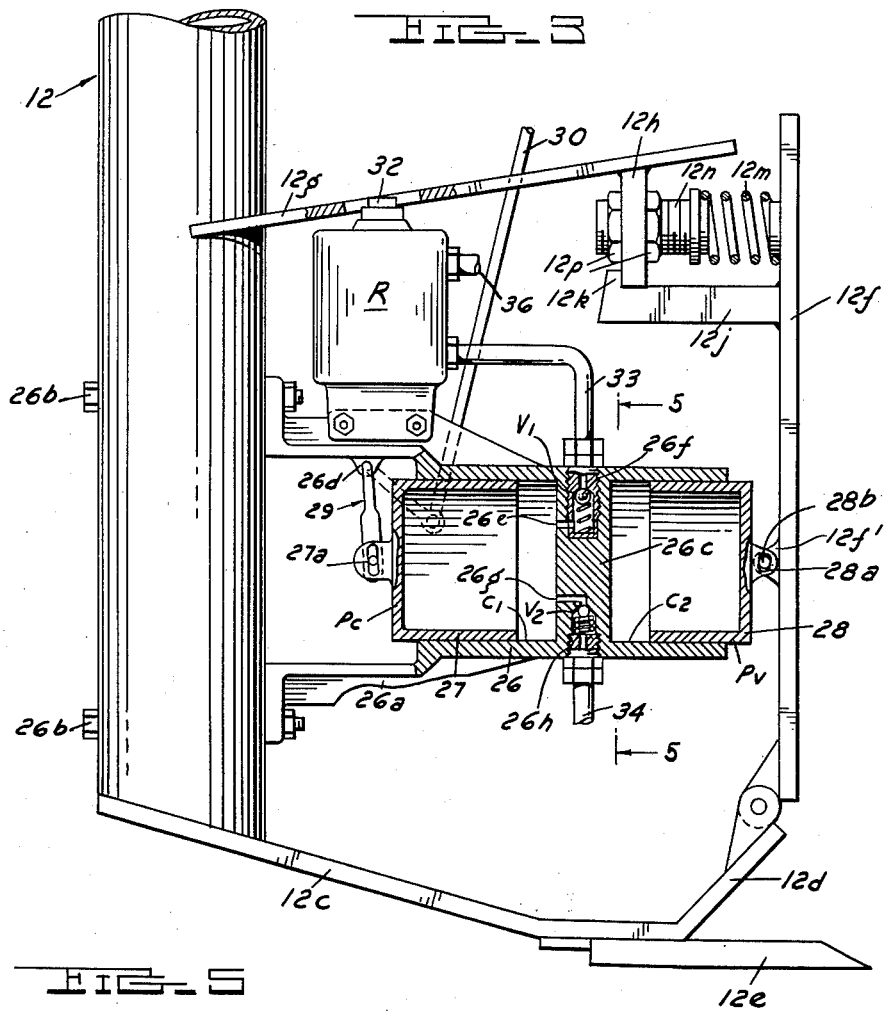
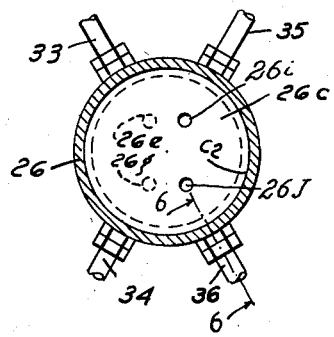
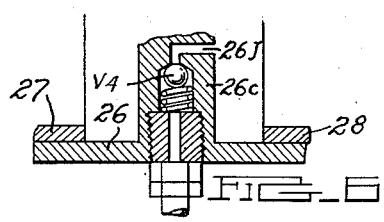
INVENTOR.
VERNON O. HAUSWIRTH
BY
ATTORNEYS United States Patent Office 2,763,201
Patented Sept. 18, 1956

2,763,201

BALE DENSITY CONTROL DEVICE

Vernon O. Hauswirth, Royal Oak, Mich., assignor, by mesne assignments, to Ford Motor Company, Dearborn, Mich., a corporation of Delaware Application January 11, 1952, Serial No. 266,015

5 Claims. (Cl. 100—43)

This invention relates to a device for automatically controlling the density of a bale in a hay baling machine for producing uniform weight bales.

A fault common to nearly all hay baling machines is their inability to produce uniformly dense bales and hence bales of substantially the same weight. There are numerous factors affecting the attainment of a uniform density of bale. Chief amongst such factors are the condition of the crop itself, volume variations of the crop charge and the relative smoothness of the baling chamber of the baling machine.

Admittedly, most hay baling machines perform quite satisfactorily. However, where the hay crop to be baled is not uniformly dry and varies considerably in ratio of leaves to stems, it is virtually impossible to obtain a bale density which is uniform from bale to bale or even within the bale itself. Some attempts have been made to correct this shortcoming but all apparently have fallen somewhat short of the desired end.

The usual practice is to variably constrict the bale chamber of the baling machine and this is conveniently accomplished by hinging at least one of the sides of the baling chamber. A pressure device is then operatively mounted on the baler to maintain the hinged side against the bale being formed. Variations in charging densities will then cause the pressure device to effect movement of the hinged bale chamber sides to vary the resistance so that a more or less uniform bale will be formed.

Such a pressure device, however, does not go far enough to remedy these variables with the result that a bale of optimum density is not obtained. For example, when a charge of heavy damp hay is introduced in compressed form into the baling chamber, its density exceeds by far the optimum density desired in the bale. The pressure device will yield only a certain extent; hence the density of the bale at that point will be greater than the desired maximum.

Accordingly, it is an object of this invention to provide a device for baling machines which will insure the formation of uniformly dense bales in order that bales of substantially identical weights may be readily produced.

Another object of this invention is to provide an improved hydraulically operated device for obtaining bales of uniform density in crop baling machines.

A further object of this invention is to provide an improved hydraulically operated device for baling machines which permits the formation of substantially uniform density bales for variable conditions of the crop and variable internal frictional resistances in the baling machine.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a fragmentary side elevational view of a crop baling machine embodying the control device of this invention.

Figure 2 is a cross sectional view taken along the plane 2—2 of Figure 1;

Figure 3 is an enlarged detail view of the baler ram showing the control device constructed in accordance with this invention assembled on the ram;

Figure 4 is a schematic view of the hydraulic circuit employed with the improved bale density control device of Figure 3;

Figure 5 is a cross sectional view taken along the plane 5—5 of Figure 3; and

Figure 6 is an enlarged cross sectional view taken along the plane 6—6 of Figure 5.

As shown on the drawings:

In Figure 1, there is shown a portion of a hay baler which has a hay compressing chamber 10 and a bale forming chamber 11. The hay compressing chamber 10 is of rectangular configuration and receives the hay or the like forced thereinto by the feeding mechanism (not shown) of the baling machine whereupon a reciprocating ram 12 compresses the hay introduced into such chamber. Successive charges of hay force the preceding charges into the baling chamber 11. Baling chamber 11 is essentially a continuation of the compression chamber 10 and has at least one of its sides 11a hingedly connected to such chamber. A pin or bolt 13 vertically inserted through suitable aligned apertures in the respective ends of the baling chamber side 11a and compression chamber 10 conveniently effects such hinged mounting. At the right hand end of chamber 11 as shown in Figures 1 and 2, there are provided a pair of transversely disposed angle iron members 14 and 15 respectively welded to the top and bottom faces of the stationary portion of baling chamber 11 and such members project laterally beyond the hinged side 11a of baling chamber 11 as best shown in Figure 2. At the outward extremities of the angle iron members 14 and 15 there is secured, by welding, a vertical angle iron support 16. To increase rigidity of the baling chamber a similar support 17 may be welded to the face of the stationary side of baling chamber 11 and to the other ends of the transverse arms 14 and 15 (Figures 1 and 2).

An hydraulic cylinder 18 including a cooperating piston 19 having a piston rod 19a is operatively connected between the vertical support 16 and the face of the hinged side 11a of baling chamber 11. Pairs of lugs 11b and 18a are respectively welded to the side of the hinged portion 11a of baling chamber 11 and to the end of hydraulic cylinder 18 and such lugs are apertured to permit the insertion of a suitable bolt 20 therethrough to pivotally mount the end of hydraulic cylinder 18 on the hinged side 11a. Piston rod 19a is threaded and projects through a suitable aperture in the vertical support 16 horizontally aligned with the axis of bolt 20. A pair of check nuts 21 threaded onto piston rod 19a and disposed on opposite sides of the support 16, as shown in Figure 2, adjustably secures such piston rod to support 16. Thus, in this application the piston is held stationary and the cylinder allowed to move. Suitable stop shoulders (not shown) may be provided within cylinder 18 which are contacted by piston 19 to limit the travel of such cylinder. The control of hydraulic cylinder 18 to effect swinging movement of the hinged side 11a of baling chamber 11 will be later described.

The ram 12 has a tubular arm 12a which has a bend therein as shown at 12b to dispose its lower end vertically as such ram enters chamber 10. The upper end of arm 12a is pivotally mounted on a vertical frame member 23 forming part of the baling machine but here shown broken away. A pillow block 24 secured by bolts 24a to the vertical frame member 23 permits pivotal mounting of the arm 12a to the vertical frame member 23. A transverse pin 25 inserted through a suitable transverse hole in the extreme upper end of arm 12a and through the pillow block 24 conveniently effects such pivotal mounting. A bottom plate 12c is transversely welded to the extreme bottom end of the tubular arm 12a. The bottom plate 12c slopes downwardly somewhat and terminates in an upwardly bent portion 12d as best shown in Figure 3. A cutting knife 12e is horizontally bolted to the bottom surface of the bottom plate 12c which cooperates with a ledger plate (not shown) provided on the entering edge of compression chamber 10 to sever portions of the crop projecting below the ram.

Ram 12 has a pressure plate 12f hingedly mounted at its lower end to the upwardly inclined portion 12d of the bottom plate 12c. Plate 12f is disposed forwardly a substantial distance from the arm 12a of ram 12. A substantially horizontal top plate 12g is welded at its rear end to the arm 12a. The forward edge of the top plate 12g falls somewhat short of the vertical position of the pressure plate 12f as best shown in Figure 3. A vertical lug 12h is welded to the underside of top plate 12g and the pressure plate 12 has a stop arm 12j horizontally welded to its rear surface and the arm 12j has an upwardly projecting lug 12k integrally formed thereon which engages the rear lower edge of lug 12h when the pressure plate 12f is in a vertical position. A compression spring 12m is mounted between pressure plate 12f and the lug 12h to yieldingly maintain the pressure plate 12f in a substantially vertical position while permitting the pressure plate 12f to be pivoted in a counterclockwise direction as shown in Figure 3 for a reason to later appear. The tension of compression spring 12m is conveniently adjusted by a screw 12n horizontally mounted within a suitable transverse aperture provided in lug 12h. A pair of adjusting nuts 12p permit adjustment of screw 12n. The screw 12n has a suitable seat to receive the abutting end of spring 12m.

A cylindrical pump housing 26 has an integral bracket 26a formed on its left hand end as best shown in Figure 3 and such bracket is secured to the lower end of arm 12a of ram 12 by a pair of bolts 26b for mounting the housing 26 on the ram. The pump housing 26 contains a pair of pump pistons 27 and 28 respectively slidably cooperating with cylinder bores C1 and C2 provided in housing 26. The bores C1 and C2 are separated by a solid partition 26c which thereby divides the housing 26 into separate pump portions. The piston 27 is conveniently reciprocated by a bell crank 29 pivotally supported by a depending lug portion 26d of bracket 26a. One arm of bell crank 29 is slidably secured within a suitable vertical slot 27a provided in the projecting rear portion of piston 27. The other arm of bell crank 29 is pivotally connected to one end of a link 30. The other end of link 30 is pivotally connected to a pillow block 31 suitably secured to the vertical frame member 23 immediately below the pillow block 24. Thus, as the ram 12 is pivotally reciprocated by the power driven mechanism (not shown) of the baler, the link 30 will effect rotation of bell crank 29 to impart a reciprocating sliding movement to the piston 27.

Piston 28 has an integral forwardly projecting lug 28a which is disposed adjacent an integral lug 12f' provided on the rear face of pressure plate 12f. The lug 28a has a vertical slot and a transverse pin 28b inserted through such slot and a suitable aperture in lug 12f' effects pivotal connection of piston 28 to the pressure plate 12f.

Pistons 27 and 28 respectively cooperating with bores C1 and C2 of the cylinder 26 comprise respectively a constant delivery pump Pc and a variable delivery pump Pv. The constant delivery pump will deliver a constant input of pressured fluid so long as the baler speed is constant. Fluid is supplied to the constant delivery pump Pc from a reservoir R which comprises an enclosed vessel suitably mounted on top of the bracket 26a as best shown in Figure 3. The reservoir R has a top fill plug 32 which is conveniently accessible through a suitable vertical opening provided in top plate 12g. Fluid from reservoir R is admitted to the cylinder 26 through a conduit 33 to a port 26e which communicates with a radial recess 26f provided in cylinder 26. A check valve V1 is suitably mounted in recess 26f to prevent return flow of fluid to the reservoir R. Thus on the suction stroke of piston 27 fluid will be drawn from the reservoir R, past the check valve V1 and into the cylinder through port 26e. On the compression stroke of piston 27, the pressured fluid is forced out through a second port 26g provided in partition 26c, thence past a second oppositely opening check valve V2 similarly mounted in a radial recess 26h in partition 26c. The pressured fluid then flows through a conduit 34 to hydraulic cylinder 18 in front of piston 19.

The variable delivery pump Pv withdraws fluid from the hydraulic cylinder 18 through a conduit 35 and port 26i in partition 26c. The conduit is connected to a check valve V3, thence into pump Pv whereupon the fluid is returned through a port 26j and conduit 36 through a combination check valve and pressure relief valve V4, thence to the reservoir R. Check valve V4 (Fig. 6) is adjusted to maintain a working pressure in cylinder 18 by preventing a back flow of the pressured fluid to the reservoir; yet such valve must also allow pump Pv to withdraw fluid from cylinder 18 and also relieve excess pressure that may be built up in such cylinder because of unusual circumstances.

For a simplified showing of the hydraulic circuit utilized with this improved control device, reference may be had to Figure 4 which diagrammatically shows the arrangement of the various valves and their relationship to the constant delivery pump Pc and the variable delivery pump Pv.

Operation

When the hay baler is in operation, the ram 12 has a reciprocating swinging movement of uniform stroke. The feeding mechanism of the baler (not shown) advances a charge of hay or other material to be baled up to the baling chamber whereupon the ram 12 on its compression stroke forces such charge into the compression chamber where it is compressed into a compact form. Each successive charge of hay introduced into the baling chamber is likewise compressed and advances the preceding charge into the baling chamber 11. When a bale of desired length has been formed in baling chamber 11, the tying mechanism of the bale machine (not shown) functions to tie the bale. The formation of a second bale behind the tied bale eventually ejects the first bale formed.

With each reciprocation of the ram 12 the constant delivery pump Pc delivers a slug of pressured fluid to hydraulic cylinder 18 during return stroke of the ram, which forces the cylinder 18 to move inwardly thereby forcing the hinged side 11a of baling chamber 11 to move inwardly to constrict the baling chamber 11. On the compression stroke of ram 12 the resistance of the hay in the compression chamber as it is compressed forces the plate 12f to be pivoted in a counterclockwise direction as best shown in Figure 3 thereby causing the variable delivery pump Pv to withdraw fluid from cylinder 18 through the conduit 36 to the reservoir R during the next return stroke of the ram. The stroke of the variable delivery pump Pv is proportional to the resistance of the hay against the pressure plate 12f. Hence, as long as this resistance remains constant, the variable pump Pv will withdraw as much fluid from cylinder 18 as put in by the constant delivery pump Pc thereby maintaining a balance so that the movable side wall 11a of baling chamber 11 will remain substantially stationary. However, when the frictional resistance of the charge of hay in the baling chamber 10 is greater or lesser than at the balance point just referred to, the stroke of the variable delivery pump will be immediately altered whereupon a greater or lesser amount of fluid will be withdrawn from the hydraulic cylinder depending upon whether the resistance is lesser or greater. Thus the cylinder 18 will be moved inwardly or outwardly to compensate for such unbalance and the movable side wall 11a of baling chamber 11 will be correspondingly moved to increase or decrease the constriction of the baling chamber to build up or decrease the resistance of the hay being compressed in the baling chamber 10. When the resistance has been built up or reduced to the desired level the variable delivery pump Pv will then again be withdrawing the same amount of fluid from cylinder 18 as put in by the constant delivery pump Pc whereupon a balance will again be obtained. It will be noted that by adjustment of the screw 12n the resistance 12f against the crop being compressed may be conveniently varied to obtain any desired degree of bale compactness.

From the above description it will be apparent that there is here provided a device for automatically controlling the density of a bale formed in a baling machine. Such device is self-adjusting to varying resistance of the charge being compressed to vary the constriction of the baling chamber in accordance with such changes in frictional resistance and compressibility of the material being baled to form a bale having a substantially uniform density. Thus bales formed in a baling machine utilizing this automatic controlling device will be of substantially uniform weight.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a baling machine having a reciprocating ram for compressing charges of a crop in a baling chamber having a movable wall portion, said baling chamber also having a relatively fixed member disposed exteriorly of said movable wall portion; a bale density control device comprising an hydraulic cylinder, means for operatively connecting said cylinder between said fixed member and the movable wall portion, means operable upon each reciprocation of the ram for delivering a fixed volume of pressured fluid to said cylinder to displace the movable wall in a direction to constrict the chamber, and pump means associated with said ram and operable upon reciprocation of the ram for withdrawing fluid from the cylinder, said pump means being directly responsive to variations in the resistance of the crop charge to the ram on its charging stroke whereby a variable amount of fluid is withdrawn from said cylinder to effect movements of the movable wall portion in accordance with said crop resistance variations.

2. In a hay baling machine having a reciprocating ram for compressing successive charges of hay in a baling chamber having a movable wall portion, said baling chamber also having a relatively fixed member disposed exteriorly of said movable wall portion; the improvements comprising an hydraulic cylinder, means for operatively connecting said cylinder between the said fixed member and the movable wall portion, an input pump operable upon each reciprocation of the ram for delivering a fixed volume of pressured fluid to the said cylinder to displace the movable wall in a direction to constrict the chamber, a variable delivery pump operable upon reciprocation of the ram for withdrawing fluid from said cylinder, and means on said ram operable in response to variations in the resistance of the crop charge to the ram on its charging stroke to vary the output of said variable delivery pump in proportion to said resistance variations, thereby variably exhausting fluid from said cylinder whereby the movable wall portion is moved to variably constrict the baling chamber.

3. In a hay baling machine having a reciprocating ram for compressing successive charges of hay in a baling chamber having a movable wall portion, said baling chamber also having a relatively fixed member disposed exteriorly of said movable wall portion; the improvements comprising an hydraulic cylinder, means for operatively connecting said cylinder between said fixed member and the movable wall portion, an input pump operable during the return stroke of the ram for delivering a uniform amount of pressured fluid to the said cylinder to displace the movable wall in a direction to constrict the baling chamber, a variable delivery pump on the ram operable by the return stroke of the ram for withdrawing fluid from said cylinder, and means on said ram operable in response to variations in the resistance of the crop charge to the ram on its charging stroke to vary the output of said variable delivery pump in proportion to said resistance variations thereby variably exhausting fluid from said cylinder and thus variably constricting the baling inversely in accordance with the resistance of the crop charge to the ram.

4. In a hay baling machine having a reciprocating ram movable to and from a charging position for compressing successive charges of hay in a baling chamber having a movable wall portion, said baling chamber also having a relatively fixed member disposed exteriorly of said movable wall portion; the improvements comprising an hydraulic cylinder, means for operatively connecting said cylinder between said fixed member and the movable wall portion, an input pump operable by one stroke of the ram for delivering a uniform amount of pressured fluid to the said cylinder to displace the movable wall in a direction to constrict the baling chamber, a pressure plate mounted on the ram for limited pivotal movement, spring means normally biasing said plate in the direction of the charging stroke, a piston pump for withdrawing fluid from said cylinder, means operatively connecting said piston pump between said pressure plate and the ram, said pressure plate being operable in response to variations in resistance of the crop charge to the ram on its charging stroke to withdraw fluid from said cylinder in proportion to said crop resistance, whereby said cylinder effects compensating movements of the movable wall.

5. In a baling machine having a reciprocable ram for compressing material within a baling chamber having a movable wall portion, the improvements of a hydraulically energizable, reciprocable bale density actuating means, means for operably connecting said bale density actuating means to said movable wall portion, first hydraulic means for energizing said actuating means to move said wall portion into said baling chamber, thereby reducing the size of said baling chamber, and additional hydraulic counteracting energizing means operable simultaneously with the first hydraulic means to move said wall from said chamber in direct response to variations in the force exerted by the ram on the material, whereby the first hydraulic means and the additional hydraulic energizing means cooperate to position said movable wall portion and to determine baling chamber size in accordance with variations in material resistance to movement of the ram.

References Cited in the file of this patent

UNITED STATES PATENTS

| | | |
|---|---|---|
| 2,576,784 | Dodds et al. | Nov. 27, 1951 |
| 2,582,672 | Bobst | Jan. 15, 1952 |
| 2,600,827 | Almquist | June 17, 1952 |